United States Patent Office 3,180,796
Patented Apr. 27, 1965

3,180,796
21-BIS-(AMINOMETHYL)-PREGNANES
Daniel Bertin, Montrouge, and Jacques Perronnet, Paris, France, assignors to Roussel-UCLAF, S.A., Paris, France, a corporation of France
No Drawing. Filed July 26, 1963, Ser. No. 297,976
Claims priority, application France, Aug. 6, 1962, 906,182; Nov. 6, 1962, 914,529
20 Claims. (Cl. 167—65)

The invention relates to novel 21-bis(aminomethyl)-pregnanes having the formula

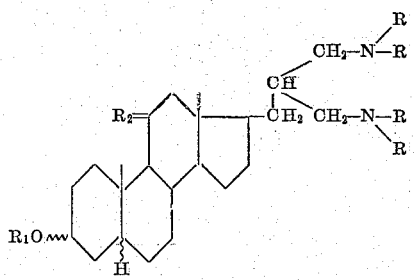

(I)

wherein R is selected from the group consisting of hydrogen and an alkyl radical having 1 to 8 carbon atoms, $R_1$ is selected from the group consisting of hydrogen and an acyl radical of an organic carboxylic acid having 1 to 18 carbon atoms and $R_2$ is selected from the group consisting of

and =O and their acid addition salts. The group $R_1O$— is in the α-position for 5β-pregnanes and in the β-position for 5α-pregnanes. The invention also relates to a novel process for preparing 21-bis-(aminomethyl)-pregnanes of Formula I and to novel intermediates therefor. The invention further relates to novel spasmolytic compositions and to a novel method of treating coronary spasms.

The 21-bis-(aminomethyl)-pregnanes of Formula I have interesting pharmacological properties, particularly a remarkable coronary dilatatory activity and a peripheric vasodilatatory activity. They are useful for the treatment of spasms of coronary origin, of angina pectoris and of coronaritis and their spasmolytic effects permit their use in asthma, bronchial spasms and arterial spasms.

It is an object of the invention to provide novel 21-bis-(aminomethyl)-pregnanes of Formula I.

It is another object of the invention to provide a novel process for the preparation of 21-bis-(aminomethyl)-pregnanes of Formula I.

It is a further object of the invention to provide novel intermediates for the preparation of 21-bis-(aminomethyl)-pregnanes of Formula I.

It is an additional object of the invention to provide novel spasmolytic compositions.

It is a further object of the invention to provide a novel method of treating spasms of coronary origin.

These and other objects and advantages of the invention will become obvious from the following detailed description.

The novel 21-bis-(aminomethyl)-pregnanes of the invention are selected from the group consisting of pregnanes having the formula

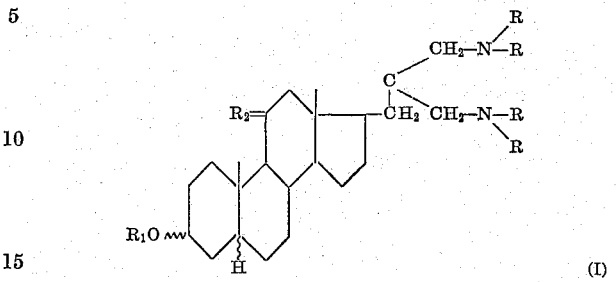

(I)

wherein R is selected from the group consisting of hydrogen and alkyl radicals having 1 to 8 carbon atoms, $R_1O$— is selected from the group consisting of hydroxy and acyloxy derived from an organic carboxylic acid having 1 to 18 carbon atoms and is in the α-position of 5β-pregnanes and in the β-position of 5α-pregnanes and $R_2$ is selected from the group consisting of

and =O and non-toxic, pharmacologically acceptable acid addition salts thereof.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids, such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids, such as undecylenic acid and oleic acid; cycloalkyl carboxylic acids, such as cyclopenyl carboxylic acid, cyclopropyl carboxylic acid, cyclobutyl carboxylic acid and cyclohexyl carboxylic acid; cycloalkyl alkanoic acids, such as cyclopentyl acetic acid, cyclohexyl acetic acid, cyclopentyl propionic acid and cyclohexyl propionic acid; arylalkanoic acids, such as phenyl acetic acid and phenyl propionic acid; aryl carboxylic acids, such as benzoic acid and 2,4-dinitrobenzoic acid; phenoxy alkanoic acids, such as phenoxy acetic acid, p-chlorophenoxy acetic acid, 2,4-dichlorophenoxy acetic acid, 4-ter-butylphenoxy acetic acid, 3-phenoxy propionic acid and 4-phenoxy butyric acid; heterocyclic carboxylic acids, such as furane-2-carboxylic acid, 5-ter-butylfurane-2-carboxylic acid, 5 - bromofurane-2-carboxylic acid and nicotinic acids; β-ketoalkanoic acids, such as acetylacetic acid, propionylacetic acid and butyrylacetic acid; amino acids, such as diethylaminoacetic acid and aspartic acid.

Examples of acids suitable to form the acid addition salts of the compounds of Formula I are inorganic acids, such as hydrochloric acid, phosphoric acid, sulfuric acid, etc. and organic acids, such as citric acid, tartaric acid, acetic acid, etc.

The novel process of the invention for the preparation of 21-bis-(aminomethyl)-pregnanes of Formula I comprises reducing a compound having the formula

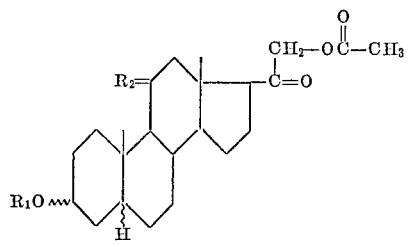

wherein $R_1$ and $R_2$ have the above definitions with an alkali metal borohydride to form the corresponding pregnane-3,20,21-triol, reacting the latter with a peracid in the presence of a lower alkanol to form the dilower alkyl acetal of corresponding 17β-formyl-androstane-3-ol, hydrolyzing the latter under acid conditions to form the corresponding 17β-formylandrostane-3-ol, reacting the latter with a lower alkyl cyanacetate in the presence of a catalyst to form the corresponding 21-carbalkoxy-21-cyano-$\Delta^{20(21)}$-pregnene-3-ol, catalytically hydrogenating the latter to form the corresponding 21-carbalkoxy-21-cyano-pregnane-3-ol, reacting the latter under alkaline conditions to form the corresponding pregnane-3-ol-21,21-dicarboxylic acid, esterifying the latter with an aliphatic alcohol to form the corresponding dialkyl ester of the pregnane-3-ol-21,21-dicarboxylic acid, reducing the latter with lithium aluminum hydride to form the corresponding 21-bis-(hydroxymethyl)-pregnane-3-ol, reacting the latter with a lower aliphatic ketone or aldehyde or a lower araliphatic ketone to form the corresponding ketonide of the 21-bis-(hydroxymethyl)-pregnane-3-ol, reacting the latter with an organic carboxylic acid having 1 to 18 carbon atoms to form the ketonide of 3-acyloxy-21-bis-(hydroxymethyl)-pregnane, subjecting the latter to acid hydrolysis and then reaction with a sulfonic acid to form the disulfonate of the 3-acyloxy-21-bis-(hydroxymethyl)-pregnane, reacting the latter with an alkali metal halide to form the 3-acyloxy-21-bis-(halomethyl)-pregnane, reacting the latter with ammonia or a primary or secondary alkyl amine to form the corresponding 3-acyloxy-21-bis-(aminomethyl)-pregnane which may be saponified to the corresponding 3-hydroxy compound or converted into its acid addition salts.

A variation of the process of the invention comprises reacting the 17β-formyl-androstane-3-ol with a dialkyl malonate, such as diethyl malonate to form the corresponding 21-bis-(carbalkoxy)-$\Delta^{20(21)}$-pregnene-3-ol, catalytically hydrogenating the latter to form the corresponding 21-bis-(carbalkoxy)-pregnane-3-ol, and reducing the latter with lithium aluminum hydride to form the corresponding 21-bis-(hydroxymethyl)-pregnane-3-ol and continuing the above synthesis. The reaction scheme is illustrated in Table A.

TABLE A

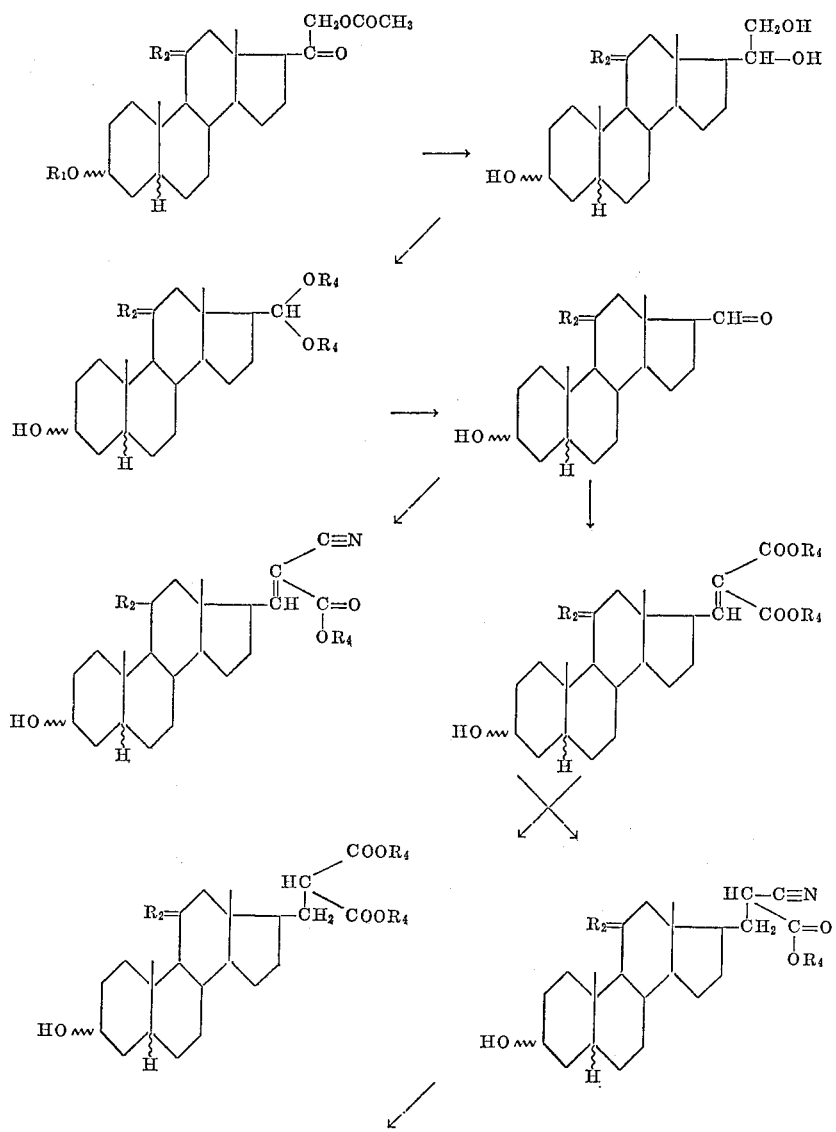

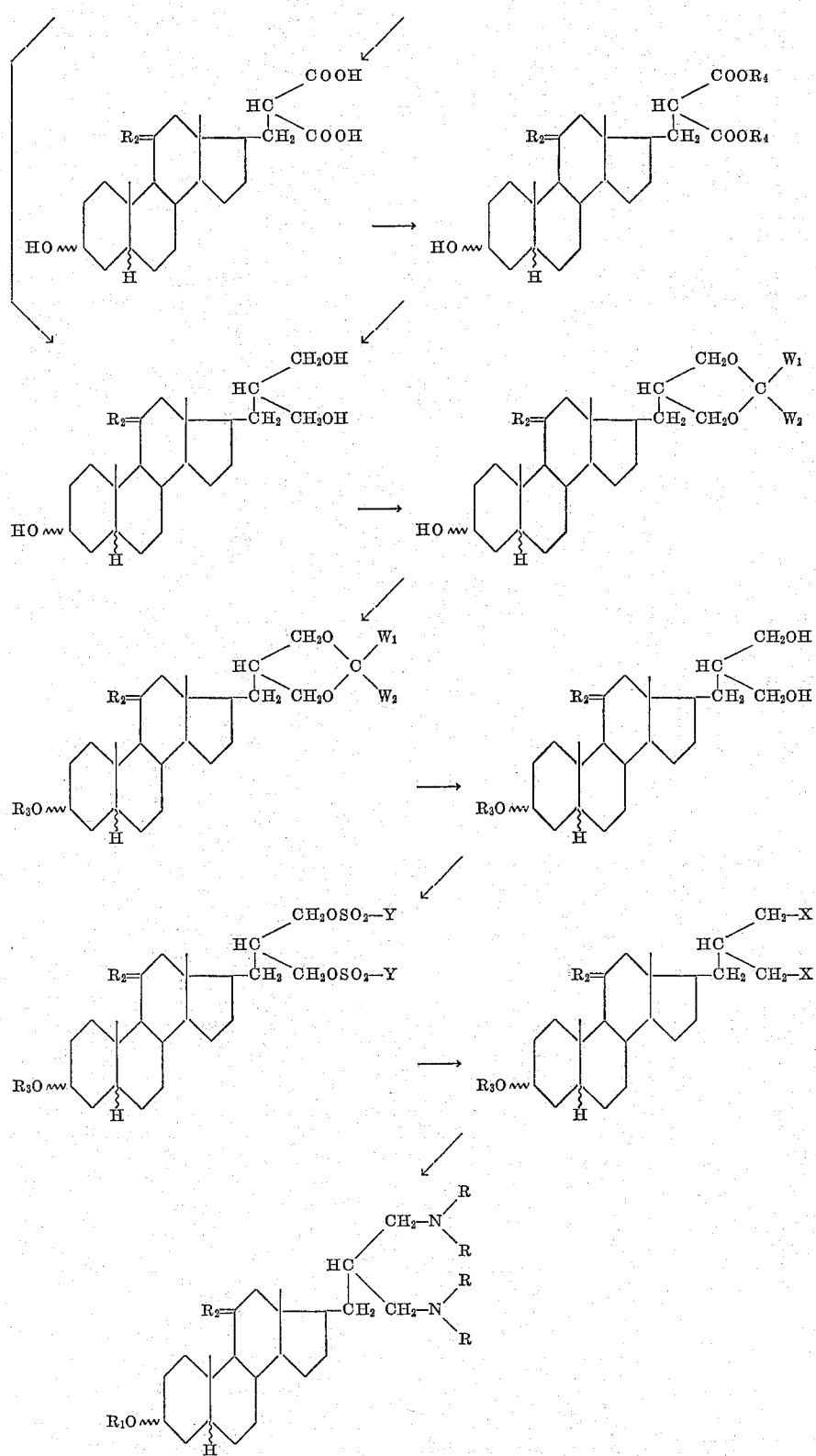

wherein R, $R_1$ and $R_2$ have the above definitions, $R_3$ is an acyl radical of an organic carboxylic acid having 1 to 18 carbon atoms, $R_4$ is a lower alkyl radical, X is a halogen, Y is an alkyl or aryl radical and $W_1$ and $W_2$ are lower alkyl radicals or hydrogen or $W_1$ is an aralkyl radical and $W_2$ is hydrogen.

A preferred mode of the process of the invention for the preparation of the 21-bis-(aminomethyl)-pregnanes of Formula I comprises reducing the 3-oxylated-21-acetoxy-pregnane-20-one with sodium borohydride in methanol followed by saponification with an alkali metal hydroxide, such as sodium hydroxide if the 3-hydroxy group is esterified to form the pregnane-3,20,21-triol, reacting the latter with periodic acid in methanol to form the dialkyl acetal of the 17β-formyl-androstane-3-ol, hydrolying the latter in aqueous ethanol in the presence of sulfuric acid to form the 17β-formyl-androstane-3-ol, condensing the latter with ethyl cyanacetate in the presence of an acetic acid-piperidine catalyst to form the 21-carbalkoxy-21-cyano-$\Delta^{20(21)}$-pregnene-3-ol, catalytically hydrogenating the latter in ethanol in the presence of a palladized carbon black catalyst to form the 21-carbalkoxy-21-cyano-pregnane-3-ol, reacting the latter with an alkali metal hydroxide solution, such as potassium hydroxide to form the pregnane-3-ol,21,21-dicarboxylic acid, esterifying the latter with methanol in the presence of a deyhdrating agent, such as gaseous hydrochloric acid to form the dimethyl ester of the pregnane-3-ol-21,21-dicarboxylic acid, reducing the latter with lithium aluminum hydride in tetrahydrofuran to form the 21-bis-(hydroxyphenyl)-pregnane-3-ol, reacting the latter with acetone in the presence of perchloric acid to form the acetonide of the 21-bis-(hydroxymethyl)-pregnane-3-ol, reacting the latter with acetic acid anhydride and pyridine to form the acetonide of the 3-acetoxy-21-bis-(hydroxymethyl)-pregnane, hydrolyzing the latter with hydrochloric acid in ethanol to form the 3-acetoxy-21-bis-(hydroxymethyl)-pregnane, reacting the latter with methane sulfonyl chloride in the presence of a tertiary amine, such as pyridine to form the dimethane sulfonate of the 3-acetoxy-21-bis-(hydroxymethyl)-pregnane, reacting the latter with sodium iodide in acetone to form 3-acetoxy-21-bis-(iodomethyl)-pregnane, and reacting the latter with an amine, such as dimethyl amine to form the 3-acetoxy-21-bis-(aminomethyl)-pregnane which can be changed to the free alcohol.

Examples of suitable amines for reaction with the 21-bis-(halomethyl)-pregnanes to form the 21-bis-(aminomethyl)-pregnanes of Formula I are monoalkyl amines, such as ethyl amine, propylamine, butyl amine, hexyl amine, etc. and dialkyl amines, such as dimethyl amine, diethyl amine, methyl ethyl amine, dipropyl amine, dibutyl amine, ethyl butyl amine, etc. Ammonia may also be used.

The novel spasmolytic compositions of the invention are comprised of a compound selected from the group of 21-bis-(aminomethyl)-pregnanes having the formula

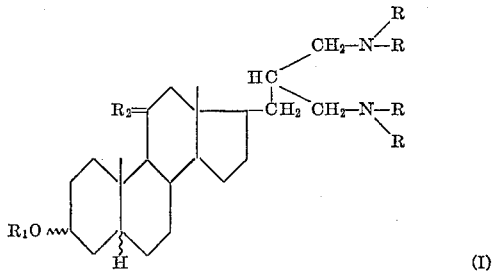

(I)

wherein R is selected from the group consisting of hyrogen and alkyl radicals having 1 to 8 carbon atoms, R₁O— is selected from the group consisting of hydroxy and acyloxy derived from an organic carboxylic acid having 1 to 18 carbon atoms and is in the α-position of 5β-pregnanes and in the β-position of 5α-pregnanes and R₂ is selected from the group consisting of

and =O and non-toxic, pharmacologically acceptable acid addition salts thereof and a major amount of a pharmaceutical carrier. The compositions can be prepared in the form of injectable aqueous solutions, of injectable suspensions, prepared in ampules, in multiple-dose flacons, in syringes ready for injection, in the form of tablets, of sugar coated tablets, of glossettes and of suppositories.

The novel method of treating spasms of coronary origin comprises administering an effective amount of a compound selected from the group consisting of 21-bis-(aminomethyl)-pregnanes having the formula

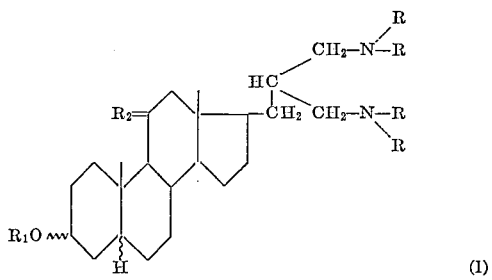

(1)

wherein R is selected from the group consisting of hydrogen and alkyl radicals having 1 to 8 carbon atoms, R₁O— is selected from the group consisting of hydroxy and acyloxy derived from an organic carboxylic acid having 1 to 18 carbon atoms and is in the α-position of 5β-pregnanes and in the β-position of 5α-pregnanes and R₂ is selected from the group consisting of

and =O and non-toxic, pharmacologically acceptable acid addition salts thereof. The said compounds may be administered orally, perlingually, transcutaneously, intravenously or rectally.

The usual useful dosage is between 5 mg. and 20 mg. per individual dose and 20 mg. to 100 mg. per day in the adult depending upon the method of administration.

In the following examples there are described several preferred embodiments to illustrate the invention. However, it should be understood that the invention is not intended to be limited to the specific embodiments.

*Example 1.—Preparation of 3α-acetoxy-21-bis-(dimethyl-aminomethyl-5β-pregnane and its dihydrochloride salt*

STEP A.—PREPARATION OF 5β-PREGNANE-3α,20,21-TRIOL 118 gm. of 21-acetoxy-5β-pregnane-3α-ol-20-one were placed in suspension in 1180 cc. of methanol and the suspension was cooled between 0° C. and —5° C. Then 29.5 gm. of sodium borohydride were added slowly under agitation over a period of about 45 minutes without increasing the temperature beyond +10° C. The reaction mixture was agitated for one hour and thirty minutes at 15°–17° C. and then the reaction was decomposed by the addition of 58 cc. of acetic acid. The solution was alkalinized by adding 35 cc. of concentrated sodium hydroxide solution and then 475 cc. of normal sodium hydroxide solution were added. The mixture was then heated to reflux for a period of about one hour, was neutralized by acetic acid, treated with animal carbon black, and filtered. The filtrate was concentrated under a vacuum and a mixture of water and ice was added thereto. The precipitate formed was vacuum filtered, washed with water and dried to obtain 105 gm. of raw 5β-pregnane-3α,20,21-triol which was recrystallized from isopropanol. The purified product had a melting point of 210–211° C., and a specific rotation $[\alpha]_D^{20}=+26°\pm2°$ (c.=0.7% in ethanol).

This product was quite soluble in alcohol, slightly soluble in benzene and chloroform, very slightly soluble in ether and insoluble in water and dilute aqueous acids and alkalis.

*Analysis.*—$C_{21}H_{36}O_3$; molecular weight=336.50. Calculated: C, 74.95%; H, 10.79%. Found: C, 75.0%; H, 10.8%.

The starting compound, 21-acetoxy-5β-pregnane-3α-ol-20-one, was prepared according to the method described by Reichstein et al. (Helv. Chim. Acta, 23, 658, 1940).

STEP B.—PREPARATION OF THE DIMETHYL ACETAL OF 17β-FORMYL-5β-ANDROSTANE-3α-OL 79 gm. of 5β-pregnane-3α,20,21-triol were dissolved in 1.35 liters of methanol. After 135 gm. of periodic acid were added, the mixture was subjected to agitation at room temperature for a period of about 90 minutes and then the reaction mixture was poured into two liters of water and two liters of a saturated solution of sodium bicarbonate. The mixture was extracted several times with ether and the combined extracts were washed with water until the wash waters were neutral, dried over magnesium sulfate, filtered and concentrated in the presence of triethylamine. The crystalline precipitate formed was vacuum filtered, triturated with petroleum ether and dried to obtain 71.6 gm. of the dimethyl acetal of 17β-formyl-5β-androstane-3α-ol having a melting point of 138° C. and 150° C. and a specific rotation $[\alpha]_D^{20} = +31.5° \pm 2°$ (c.=0.5% in ethanol).

The product was soluble in chloroform, slightly soluble in acetone and isopropyl ether, and insoluble in water and dilute aqueous alkalis.

*Analysis.*—$C_{22}H_{38}O_3$; molecular weight=350.52. Calculated: C, 75.38%; H, 10.92%; O, 13.70%. Found: C, 75.6%; H, 10.8%; O, 13.6%.

This compound is not described in the literature.

STEP C.—PREPARATION OF 17β-FORMYL-5β-ANDROSTANE-3α-OL 5 gm. of the dimethyl acetal of 17β-formyl-5β-androstane-3α-ol were placed in suspension in 100 cc. of a 50% aqueous ethanol solution together with 10 cc. of a normal solution of sulfuric acid. The mixture was heated to reflux for a period of about seventy-five minutes under agitation and was then poured into water. The precipitate formed was extracted with ether and the ethereal extract was washed with water until the wash waters were neutral, dried and concentrated to obtain 4.4 gm. of raw 17β-formyl-5β-androstane-3α-ol which was used as such for the next step of the synthesis.

The product was soluble in ether, benzene and chloroform and insoluble in water.

This compound is not described in the literature.

STEP D.—PREPARATION OF 21-CYANO-21-CARBETHOXY-Δ$^{20(21)}$-5β-PREGNENE-3α-OL 4.62 gm. of 17β-formyl-5β-androstane-3α-ol were dissolved in 90 cc. of benzene and a mixture of 4.6 cc. of acetic acid, 0.46 cc. of piperidine and 2.2 cc. of ethyl cyanacetate were added to the resulting solution. The reaction mixture was heated to reflux under agitation for a period of about five hours while recycling the benzene into the reaction mixture after decantation of the water azeotropically entrained. The reaction mixture was then allowed to cool and ether was added thereto. The organic solution was separated, washed successively with a saturated salt solution, with a saturated solution of sodium bicarbonate, and again with a saturated salt solution, dried over magnesium sulfate, and concentrated. The residue was taken up in a hot mixture of 8 cc. of petroleum ether and 10 cc. of isopropylic ether. The crystals formed were vacuum filtered, washed with a mixture of the preceding solvents and dried to obtain 4.989 gm. of 21-cyano-21-carbethoxy-Δ$^{20(21)}$-5β-pregnene-3α-ol which were utilized as such for the following step of the synthesis.

For analysis, the compound was recrystallized from isopropylic ether and the purified product had a melting point of 130–132° and a specific rotation $[\alpha]_D^{20} = -20.3°$ (c.=1% in ethanol).

The product was soluble in chloroform, rather soluble in ether, slightly soluble in isopropylic ether, insoluble in water, petroleum ether and dilute aqueous acids and alkalis.

*Analysis.*— $C_{25}H_{37}O_3N$; molecular weight=399.56. Calculated C, 75.14%; H, 9.33%; N, 3.50%. Found: C, 75.0%; H, 9.2%; N, 3.7%.

This compound is not described in the literature.

STEP E.—PREPARATION OF 21-CYANO-21-CARBETHOXY-5β-PREGNANE-3α-OL 475 mg. of palladized carbon black containing 10% of palladium hydroxide were placed in suspension in 15 cc. of ethanol and hydrogen was introduced until the catalyst was saturated. Then a solution of 4.75 gm. of 21-cyano-21-carbethoxy-Δ$^{20(21)}$-5β-pregnene-3α-ol in 95 cc. of ethanol were added together with 0.47 cc. of a 0.1 N solution of sodium hydroxide and the reaction mixture was subjected to hydrogenation for a period of about eight minutes under agitation. The mixture was filtered and the filtrate was concentrated under vacuum and under a current of nitrogen to obtain 4.8 gm. of raw 21-cyano-21-carbethoxy-5β-pregnane-3α-ol which was used as such for the following step of the synthesis.

The product was soluble in alcohol and isopropyl ether and insoluble in water and dilute aqueous acids and alkalis.

This compound is not described in the literature.

STEP F.—PREPARATION OF 5β-PREGNANE-3α-OL-21,21-DICARBOXYLIC ACID 4.8 gm. of 21-cyano-21-carbethoxy-5β-pregnane-3α-ol were dissolved in 15 cc. of methanol and then 10 cc. of a solution composed of 40 gm. of potassium hydroxide and 50 cc. of water were added thereto. The reaction mixture was heated to 50° C. for a period about fifteen minutes, and the rest of the potassium hydroxide solution prepared above was added and the entire mixture was heated to reflux for a period of about two hours. The crystalline precipitate formed was vacuum filtered, triturated with alcohol and dried to obtain 4.525 gm. of the dipotassium salt of 5β-pregnane-3α-ol 21,21-dicarboxylic acid. A second lot of 266 mg. of the product were also obtained from the alcoholic wash liquors.

This compound is not described in the literature.

4.79 gm. of the said dipotassium salt were dissolved in 75 cc. of water and the solution was filtered and acidified by the addition of 2 cc. of concentrated hydrochloric acid. The precipitate formed was extracted with 300 cc. of ethyl acetate and the solution obtained was washed several times with a saturated salt solution, dried over magnesium sulfate and concentrated to one-tenth of its volume. The crystals formed were vacuum filtered, washed with ether and dried to obtain 2.706 gm. of pure 5β-pregnane-3α-ol-21,21-dicarboxylic acid having a melting point of 244–245° C. (with decomposition), and a specific rotation $[\alpha]_D^{20} = +41° \pm 1.5°$ (c.=0.75% in ethanol).

This product was soluble in alcohols, dimethylformamide and dilute aqueous alkalis, slightly soluble in ethyl acetate and insoluble in ether, water, benzene, acetone and chloroform.

*Analysis.*—$C_{23}H_{36}O_5$; molecular weight=392.52. Calculated: C, 70.37%; H, 9.24%. Found: C, 70.3%; H, 9.1%.

This compound is not described in the literature.

STEP G.—PREPARATION OF THE DIMETHYL ESTER OF 5β-PREGNANE-3α-OL-21,21-DICARBOXYLIC ACID 2.52 gm. of 5β-pregnane-3α-ol-21,21-dicarboxylic acid were placed in suspension in 50 cc. of a 1.5 N solution of dry hydrochloric acid in methanol and the reaction mixture was heated to reflux for a period of about one hour. After cooling, the mixture was neutralized by the addition of 10 cc. of triethylamine and the major part of the methanol was distilled therefrom. The residue was taken up by a mixture of ether and methylene chloride and the solution was washed with water, then several times with a 10% solution of sodium bicarbonate, and again with water until the wash waters were neutral. The organic phase was dried over magnesium sulfate and concentrated to obtain 2.779 gm. of raw dimethyl ester of 5β-pregnane-3α-ol-21,21-dicarboxylic acid which was used as such for the following step of the synthesis.

For analysis the raw material was crystallized from a mixture of benzene and cyclohexane (1 to 1) and then from a mixture of hexane and isopropyl ether to obtain a purified product having a melting point of about 80–90° C. and a specific rotation $[\alpha]_D^{20} = +37° \pm 1°$ (c.=1% in methanol).

The product was soluble in ether, benzene, chloroform, slightly soluble in isopropyl ether and cyclohexane, and insoluble in water and petroleum ether.

*Analysis.*—$C_{25}H_{40}O_5$; molecular weight=420.57. Calculated: C, 71.39%; H, 9.58%. Found: C, 71.6%; H, 9.7%.

This compound is not described in the literature.

STEP H.—PREPARATION OF 21-BIS-(HYDROXYMETHYL)-5β-PREGNANE-3α-OL 3.25 gm. of lithium aluminum hydride were introduced under cooling into 80 cc. of tetrahydrofuran and then a solution of 2.7 g. of the dimethyl ester of 5β-pregnane-3α-ol-21,21-dicarboxylic acid in 40 cc. of tetrahydrofuran was added thereto. The suspension obtained was subjected for a period of about six hours to agitation at room temperature and under nitrogen and then was cooled and slowly 30 cc. of ethyl acetate were added in order to destroy the excess of lithium aluminum hydride. 90 cc. of a saturated solution of sodium chloride were added and the organic phase was separated, washed with a saturated solution of sodium chloride, dried over magnesium sulfate, filtered and concentrated to obtain 2.030 gm. of raw 21-bis-(hydroxymethyl)-5β-pregnane-3α-ol. The raw product was taken up with a mixture of ethanol-water and sodium hydroxide solution, heated to reflux under nitrogen for a period of 30 minutes and neutralized with acetic acid. Water was added to the solution and it was allowed to crystallize in the cold to obtain 21-bis-(hydroxymethyl)-5β-pregnane-3α-ol having a melting point of 166–167° C. and a specific rotation $[\alpha]_D^{20}=+48°$ (c.=0.7% in ethanol).

The product was soluble in alcohol, slightly soluble in chloroform and ethyl acetate and insoluble in ether.

*Analysis.*—$C_{23}H_{40}O_3$; molecular weight=364.55. Calculated: C, 75.78%; H, 11.06%. Found: C, 75.8%; H, 11.2%.

This compound is not described in the literature.

21 - bis - (hydroxymethyl) - 5β - pregnane - 3α - ol was also obtained by the condensation of diethyl malonate on 17β - formyl - 5β - androstane - 3α - ol to form 21-bis-(carbethoxy)-Δ$^{20(21)}$-5β-pregnene-3α-ol. This compound was soluble in ether, benzene and chloroform, and is not described in the literature.

The latter compound was reduced by hydrogenation in the presence of a palladium catalyst to form 21-bis-(carbethoxy)-5β-pregnane-3α-ol which was soluble in ether, benzene and chloroform, and is not described in the literature.

The latter compound was finally reduced by means of lithium aluminum hydride in tetrahydrofuran to form 21-bis-(hydroxymethyl)-5β-pregnane-3α-ol.

STEP I.—PREPARATION OF THE ACETONIDE OF 21-BIS-(HYDROXYMETHYL)-5β-PREGNANE-3α-OL 3.1 gm. of 21-bis-(hydroxymethyl)-5β-pregnane-3α-ol were placed in suspension in 264 cc. of acetone and 0.62 cc. of 65% perchloric acid solution was added slowly and the mixture was allowed to stand under agitation at room temperature for a period of about two hours. Then the reaction mixture was neutralized by the addition of sodium carbonate and the agitation was maintained for a period of about ninety minutes. The reaction mixture was filtered and concentrated in the presence of triethylamine and the concentrated solution was added to water. The crystals formed were vacuum filtered, washed successively with a mixture of ice water and acetone and with water and dried to obtain 3.2 gm. of the raw acetonide of 21-bis-(hydroxymethyl)-5β-pregnane-3α-ol which was utilized as such for the following step.

For analysis, the raw product was recrystallized from acetone and the purified acetonide of 21-bis-(hydroxymethyl)-5β-pregnane-3α-ol had a melting point of 146–147° C. and a specific rotation $[\alpha]_D^{20}=+43°\pm1.5°$ (c.=0.75% in ethanol).

The product was soluble in chloroform, slightly soluble in acetone, and insoluble in water and dilute aqueous alkalis.

*Analysis.*—$C_{26}H_{44}O_3$; molecular weight=404.61. Calculated: C, 77.17%; H, 10.96%; O, 11.87%. Found: C, 77.2%; H, 11.0%; O, 12.1%.

This compound is not described in the literature.

STEP J.—PREPARATION OF THE ACETONIDE OF 3α-ACETOXY-21-BIS-(HYDROXYMETHYL)-5β-PREGNANE 3.15 gm. of the acetonide of 21-bis-(hydroxymethyl)-5β-pregnane-3α-ol were dissolved in 16 cc. of pyridine and 8 cc. of acetic acid anhydride. The reaction mixture was maintained for a period of two hours at room temperature under nitrogen and then was poured into a mixture of water and ice. The mixture was agitated for a period of about a half hour and the precipitate formed was vacuum filtered, washed with water and dried to obtain 3.35 gm. of the raw acetonide of 3α-acetoxy-21-bis(hydroxymethyl)-5β-pregnane which was utilized as such for the following step.

For analysis, the product was recrystallized from methanol and the purified acetonide of 3α-acetoxy-21-bis-(hydroxymethyl)-5β-pregnane had a melting point of 117–118° C. and a specific rotation $[\alpha]_D^{20}=+56°\pm1°$ (c.=0.95% in chloroform).

The product was soluble in ether and chloroform, slightly soluble in alcohols and insoluble in water and dilute aqueous alkalis.

*Analysis.*—$C_{28}H_{46}O_4$; molecular weight=446.65. Calculated: C, 75.29%; H, 10.38%; O, 14.33%. Found: C, 75.5%; H, 10.4%; O, 14.0%.

This compound is not described in the literature.

STEP K.—PREPARATION OF 3α-ACETOXY-21-BIS-(HYDROXYMETHYL)-5β-PREGNANE 3.30 gm. of the acetonide of 3α-acetoxy-21-bis-(hydroxymethyl)-5β-pregnane were placed in suspension in 33 cc. of ethanol and 3.3 cc. of water. This suspension was agitated under nitrogen and 0.83 cc. of concentrated hydrochloric acid was added thereto. The reaction mixture was maintained under agitation at room temperature for a period of about three hours and then, successively, 1.5 cc. of triethylamine and water were added thereto. The precipitate formed was extracted with several aliquots of methylene chloride and the organic solution was washed with saturated salt solution, dried over magnesium sulfate, treated with animal carbon black, filtered and concentrated. The residue was taken up with refluxing benzene, cyclohexane was added and the product was allowed to crystallize to obtain 2.4 gm. of 3α-acetoxy-21-bis-(hydroxymethyl)-5β-pregnane having a melting point of 129–130° C. and a specific rotation $[\alpha]_D^{20}=+65°$ (c.=0.8% in ethanol).

The product was soluble in alcohol and chloroform, slightly soluble in benzene, very slightly soluble in cyclohexane, and insoluble in water, and dilute aqueous acids and alkalis.

*Analysis.*—$C_{25}H_{42}O_4$; molecular weight=406.59. Calculated: C, 73.83%; H, 10.42.%; O, 15.75%. Found: C, 74.0%; H, 10.3%; O, 15.9%.

This compound is not described in the literature.

STEP L.—PREPARATION OF THE DIMETHANE SULFONATE OF 3α-ACETOXY-21-(HYDROXYMETHYL)-5β-PREGNANE 2.4 gm. of 3α - acetoxy - 21 - bis - (hydroxymethyl)-5β-pregnane were dissolved in 12 cc. of pyridine. The reaction mixture was cooled to −15° C. and slowly under agitation, 1.5 cc. of methane sulfonyl chloride were added. The reaction mixture was maintained under agitation and under nitrogen at −10° C. for a period of about five hours and then was poured into 120 cc. of a mixture of water and ice and 12 cc. of concentrated hydrochloric acid. The resinous precipitate formed was extracted with several aliquots of methylene chloride and the combined extracts were washed with water, dried and concentrated to obtain 3.4 gm. of raw dimethane sulfonate of 3α - acetoxy - 21 - bis - (methoxymethyl) - 5β - pregnane which was utilized as such for the next step of the synthesis.

This compound is not described in the literature.

STEP M.—PREPARATION OF 3α-ACETOXY-21-BIS-(IODOMETHYL)-5β-PREGNANE 3.30 gm. of the dimethane sulfonate of 3α-acetoxy-21-bis-(hydroxymethyl)-5β-pregnane, 80 cc. of acetone and 5.0 gm. of sodium iodide were mixed and the mixture was agitated and heated to reflux for a period of about two hours and a half. The mixture was then cooled and water was added thereto. The reaction mixture was extracted with ether and the extracts were combined, dried and concentrated to obtain 3.585 gm. of raw 3α-acetoxy-21-bis-(iodomethyl)-5β-pregnane which was purified by subjecting it to chromatography through silica gel with elution with methylene chloride. 2.2 gm. of 3α-acetoxy-21-bis-(iodomethyl)-5β-pregnane were obtained after recrystallization from acetone and the purified product had a melting point of 122-124° C. and a specific rotation $[\alpha]_D^{20} = +40°$ (c.=1% in chloroform).

This product was soluble in ether, chloroform and benzene, slightly soluble in alcohol and ethyl acetate and insoluble in methanol.

Analysis.—$C_{25}H_{40}O_2I_2$; molecular weight=626.41. Calculated: C, 47.93%; H, 6.44%; I, 40.52%. Found: C, 48.2%; H, 6.3%; I, 40.9%.

This compound is not described in the literature.

STEP N.—PREPARATION OF 3α - ACETOXY - 21 - BIS-(DIMETHYLAMINOMETHYL)-5β-PREGNANE AND ITS DIHYDROCHLORIDE 1.1 gm. of 3α-acetoxy-21-bis-(iodomethyl)-5β-pregnane were dissolved in 50 cc. of dimethylamine and the reaction mixture was maintained in a closed receptacle at room temperature under agitation for a period of about fifteen hours. The dimethylamine was then distilled therefrom and the residue was taken up with ether and with alkaline water. The organic phase was separated and extracted with dilute hydrochloric acid. The new aqueous phase was separated, alkalinized and extracted with ether. The ethereal solution was washed with water, dried over magnesium sulfate and concentrated to obtain 730 mg. of raw 3α-acetoxy-21-bis-(dimethylaminomethyl)-5β-pregnane.

This compound is not described in the literature.

In order to obtain the dihydrochloride of 3α-acetoxy-21-bis-(dimethylaminomethyl)-5β-pregnane, the product obtained was dissolved in a mixture of isopropanol and ether and 9 cc. of a solution of 0.37 N dry hydrochloric acid and isopropanol were added and the solution was allowed to stand for crystallization. The crystals formed were vacuum filtered, washed with ether and dried to obtain 525 mg. of the product. 255 mg. of a second yield, starting from the mother liquors, were also obtained. The raw product was purified by recrystallization from a mixture of methanol-isopropanol and the purified dihydrochloride of 3α-acetoxy-21-bis-(dimethylaminomethyl)-5β-pregnane had a melting point of 220° C. (with decomposition) and a specific rotation $[\alpha]_D^{20} = +68° \pm 3°$ (c.=0.5% in water).

The product was soluble in alcohol and water and insoluble in ether and benzene.

Analysis.—$C_{29}H_{54}O_2N_2Cl_2$; molecular weight=533.65. Calculated: O, 65.26%; H, 10.19%; N, 5.26%; Cl, 13.29%. Found: O, 65.2%; H, 9.8%; N, 5.3%; Cl, 13.1%.

This compound is not described in the literature.

STEP O.—PREPARATION OF 21-BIS-(DIMETHYLAMINOMETHYL)-5β-PREGNANE-3α-OL AND ITS DIHYDROCHLORIDE 0.440 gm. of the raw dihydrochloride of 3α-acetoxy-21-bis-(dimethylaminomethyl)-5β-pregnane, obtained according to Step N, were dissolved in 8.8 cc. of methanol. 1.5 cc. of sodium hydroxide solution were added and the reaction mixture was agitated for a period of three hours under nitrogen at room temperature. The reaction mixture was taken up with water and extracted with ether. The organic layer was washed with water, dried and concentrated in a vacuum to obtain 0.300 gm. of raw 21-bis-(dimethylaminomethyl)-5β-pregnane-3α-ol.

This compound is not described in the literature.

In order to obtain the dihydrochloride of 21-bis-(dimethylaminomethyl)-5β-pregnane-3α-ol, the raw product obtained above was dissolved in isopropanol saturated with hydrochloric acid. The reaction mixture was evaporated to dryness under vacuum and the residue was taken up with acetone in which it is insoluble. The crystals formed were redissolved in a mixture of methanol and acetone and the solution was filtered. The filtrate was concentrated, acetone was added until crystallization began and the crystals were vacuum filtered. After drying, 0.190 gm. of the pure dihydrochloride of 21-bis-(dimethylaminomethyl)-5β-pregnane-3α-ol having a melting point of 250° C. (with decomposition) and a specific rotation $[\alpha]_D^{20} = +54.5° \pm 2.5°$ (c.=0.6% in water) were recovered.

The product was soluble in alcohol and water, slightly soluble in acetone and isopropanol and insoluble in ether.

Analysis.—$C_{27}H_{52}ON_2Cl_2$; molecular weight=491.62. Calculated: C, 65.98%; H, 10.66%; N, 5.70%; Cl, 14.42%. Found: C, 66.1%; H, 10.5%; N, 5.3%; Cl, 14.2%.

This compound is not described in the literature.

*Example II.*—*Preparation of 3β-acetoxy-21-bis-(dimethylaminomethyl)-5-pregnane and its dihydrochloride salt*

STEP A.—PREPARATION OF 5α-PREGNANE-3β,20,21-TRIOL 146 gm. of 21-acetoxy-5α-pregnane-3β-ol-20-one were placed in suspension in 7.5 liters of methanol and after the reaction mixture was cooled to between −3° and −5° C., 75 gm. of sodium borohydride were slowly added. The reaction mixtrue was held at this temperature for a period of about ninety minutes and then 150 cc. of acetic acid were added. About 5 liters of methanol were distilled from the reaction mixture and the resultant mixture was alkalinized by the addition of sodium hydroxide solution (pH=9). 600 cc. of normal sodium hydroxide solution were then added and the reaction mixture was heated to reflux for a period of about thirty minutes, diluted with water and neutralized by the addition of acetic acid. About 4 liters of water were then added and the crystalline precipitate formed was vacuum filtered, washed with water and dried under vacuum to obtain 131 gm. of raw 5α-pregnane-3β,20,21-triol which upon recrystallization from ethanol had a melting point of 208° C., after recrystallization 212° C., and a specific rotation $[\alpha]_D^{20} = +11.2°$ (c.=1% in ethanol) and was employed as such for the following step for the synthesis.

The starting compound was prepared according to the method described by Reichstein et al. [Helv. Chim. Acta, 22, 1209 (1939)].

STEP B.—PREPARATION OF THE DIMETHYL ACETAL OF 17β-FORMYL-5α-ANDROSTANE-3β-OL 90 gm. of 5α-pregnane-3β,20,21-triol were introduced into 1800 cc. of methanol and then 160 gm. of periodic acid were added under agitation and under nitrogen at a temperature of 15° C. The agitation under an atmosphere of nitrogen was maintained for a period of about one hour. The suspension obtained was poured into a mixture of 2.5 liters of a 10% solution of sodium bicarbonate, 15 liters of water and 2.5 liters of methylene chloride. The entire mixture was subjected to agitation and the organic phase was separated and washed several times with water. The mother liquors were extracted with methylene chloride and the methylene chloride solutions were combined, dried over magnesium sulfate, treated with animal carbon black, filtered and concentrated. 250 cc. of ethyl acetate were added to the concentrated solution and this solution was concentrated further and then another 100 cc. of ethyl acetate were added. This solution was again concentrated further and 200 cc. of isopropyl ether were added. The solution was cooled and the crystals formed were vacuum filtered, washed and dried to obtain 80 gm. of the dimethyl acetal of 17β-formyl-5α-androstane-3β-ol. For analysis, the product was recrystallized from ethyl acetate to give a product having a melting point of 194° C. and a specific rotation $[\alpha]_D^{20} = +17.5°$ (c.=0.9% in methanol).

This product was soluble in chloroform, slightly soluble in alcohol and ethyl acetate, and insoluble in ether.

*Analysis.*—$C_{22}H_{38}O_3$: molecular weight=350.53. Calculated: C, 75.38%; H, 10.92%. Found: C, 75.4%; H, 10.8%.

This compound is not described in the literature.

STEP C.—PREPARATION OF 17β-FORMYL-5α-ANDROSTANE-3β-OL 80 gm. of the dimethyl acetal of 17β-formyl-5α-androstane-3β-ol were introduced into 1600 cc. of a 50% ethanol-water solution and 160 cc. of N sulfuric acid. The reaction mixture was heated to reflux under an atmosphere of nitrogen for a period of about one hour and then 3200 cc. of water were slowly added. The crystals formed were vacuum filtered, washed with water until the wash waters were neutral and dried under vacuum to obtain 73 gm. of raw 17β-formyl-5α-androstane-3β-ol which had a melting point of 103° C. and a specific rotation $[\alpha]_D^{20} = +45.9°$ (c.=1% in benzene), and was utilized as such for the following step of the synthesis.

STEP D.—PREPARATION OF 21-CARBETHOXY-21-CYANO-Δ$^{20(21)}$-5α-PREGNENE-3β-OL 68 gm. of 17β-formyl-5α-androstane-3β-ol was added to a mixture of 1,360 cc. of benzene, 68 cc. of acetic acid, 6.8 cc. of piperidine and 33 cc. of ethyl cyanacetate. The entire mixture was heated to reflux for a period of five hours while recycling the benzene after decantation therefrom of the water azeotropically entrained. The reaction mixture was cooled and the organic phase was separated, washed successively with saturated salt solution, with a 10% solution of sodium bicarbonate and with a saturated salt solution, dried and distilled to dryness. The residue was taken up at reflux with 200 cc. of isopropyl ether and then cooled. The crystals formed were vacuum filtered and dried to obtain 57 gm. of raw 21-carbethoxy-21-cyano-Δ$^{20(21)}$-5α-pregnene-3β-ol which upon recrystallization from isopropyl ether had a melting point of 138° C., and a specific rotation $[\alpha]_D^{20} = -72°$ (c.=1% in ethanol).

The product was soluble in benzene, slightly soluble in alcohol and ether and insoluble in water.

*Analysis.*—$C_{25}H_{37}O_3N$; molecular weight=399.56. Calculated: C, 75.14%; H, 9.33%; N, 3.50%. Found: C, 75.0%; H, 9.2%; N, 3.7%.

This compound is not described in the literature.

STEP E.—PREPARATION OF 5α-PREGNANE-3β-OL-21,21-DICARBOXYLIC ACID 58 gm. of 21-carbethoxy-21-cyano-Δ$^{20(21)}$-5-α-pregnene-3β-ol and 6 gm. of palladized carbon black containing 10% of palladium hydroxide were placed in suspension in 1,750 cc. of ethanol. The pH value was adjusted to 8.8 by the addition of a N/10 solution of sodium hydroxide and the reaction mixture was purged and hydrogenated for about twenty minutes. The catalyst was filtered and the filtrate was distilled to dryness to obtain 60 gm. of raw 21-carbethoxy-21-cyano-5α-pregnane-3β-ol having a melting point of 110° C., which was utilized as such for the following step of the synthesis.

This compound is not described in the literature.

60 gm. of the 21-carbethoxy-21-cyano-5α-pregnane-3β-ol was introduced into 600 cc. of ethanol and then 54 cc. of potassium hydroxide and 68 cc. of water were added. The reaction mixture was heated to reflux for a period of about thirty minutes and then 500 cc. of potassium hydroxide solution and 600 cc. of water were added and the reaction mixture was again heated to reflux while distilling for a period of about seven hours in such a manner that the ethanol was eliminated. The crystalline precipitate formed was vacuum filtered to obtain the dipotassium salt of 5α-pregnane-3β-ol-21,21-dicarboxylic acid.

This salt was taken up by a mixture of water, methylethyl ketone and concentrated hydrochloric acid (pH of the aqueous phase less than 1). The organic phase was separated and the solution of methylethyl ketone was washed with water until the wash waters were neutral, dried rapidly over sodium sulfate, treated with animal carbon black and filtered. The solution was concentrated to a small volume, ethyl acetate was added thereto and the solution was iced. The crystals formed were vacuum filtered, washed with ethyl acetate and dried to obtain 32 gm. of 5α-pregnane-3β-ol-21,21-dicarboxylic acid having a melting point of 230–235° C. (with decomposition), and a specific rotation $[\alpha]_D^{20} = +21°$ (c.=0.5% in methylethyl ketone saturated with water).

The product was soluble in aqueous methylethyl ketone, slightly soluble in alcohol and dilute aqueous alkalis and insoluble in water, ether and chloroform.

*Analysis.*—$C_{23}H_{36}O_5$; molecular weight=392.52. Calculated: C, 70.37%; H, 9.24%. Found: C, 70.4%; H, 9.2%.

This compound is not described in the literature.

STEP F.—PREPARATION OF 21-BIS-(HYDROXYMETHYL)-5α-PREGNANE-3β-OL 20 gm. of 5α-pregnane-3β-ol-21,21-dicarboxylic acid were introduced into 400 cc. of a 1.5 N solution of dry hydrochloric acid in methanol. The reaction mixture was heated to reflux for a period of about one hour, then cooled, diluted by the addition of methylene chloride, and neutralized by the addition of triethylamine. The organic phase was washed successively with water, with N hydrochloric acid, with a 10% solution of sodium bicarbonate and with water, dried and distilled to dryness. The residue was taken up by a mixture of isopropyl ether and petroleum ether (1:1) and iced. The crystals formed were vacuum filtered and dried to obtain 18.4 gm. of raw dimethyl ester of 5α-pregnane-3β-ol-21,21-dicarboxylic acid. A second yield of 2.1 gm. of product was obtained by concentration of the mother liquors. The product which melted at 112–115° C. was employed as such for the next stage of the synthesis.

This compound is not described in the literature.

25 gm. of mixed lithium-aluminum hydride were introduced into 600 cc. of tetrahydrofuran while cooling, and to this suspension a solution of 20.5 gm. of the dimethyl ester of 5α-pregnane-3β-ol-21,21-dicarboxylic acid and 500 cc. of tetrahydrofuran was added and the reaction mixture was agitated at room temperature for a period of about six hours. Then the mixture was cooled to 0° C. and slowly and successively 250 cc. of ethyl acetate and 500 cc. of saturated salt solution were added and the organic phase was decanted. The mineral salts were extracted by aqueous tetrahydrofuran and the extracts were washed with a saturated salt solution. The mother liquors were re-extracted with tetrahydrofuran and the combined tetrahydrofuran extracts were dried over magnesium sulfate, concentrated and ethyl acetate was added. The mixture was concentrated again and cooled. The crystals formed were vacuum filtered and washed with ethyl acetate to obtain 10.8 gm. of 21-bis-(hydroxymethyl)-5α-pregnane-3β-ol having a melting point of 214° C. and a specific rotation $[\alpha]_D^{20} = +35.9°$ (c.=1% in 95% ethanol). A second lot of 1.64 gm. of the product was obtained starting from the mother liquors.

The product was soluble in 95% ethanol and aqueous tetrahydrofuran and insoluble in water and ethyl acetate.

*Analysis.*—$C_{23}H_{40}O_3$; molecular weight=364.55. Calculated: C, 75.78%; H, 11.06%. Found: C, 75.6%; H, 10.9%.

This compound is not described in the literature.

STEP G.—PREPARATION OF 3β-ACETOXY-21-BIS-(HYDROXYMETHYL)-5α-PREGNANE 10 gm. of 21-bis-(hydroxymethyl)-5α-pregnane-3β-ol were placed in suspension in 800 cc. of acetone and 2 cc. of 65% perchloric acid solution were added thereto. The reaction mixture was held at room temperature for a period of two hours and then 10 cc. of sodium carbonate were added. The reaction mixture was agitated for a period of about one hour, filtered and 2 cc. of triethylamine were added. The mixture was then concentrated to a volume of about 60 cc. and 60 cc. of water were added thereto. The mixture was cooled and the crystals formed were vacuum filtered, washed with water, dried to obtain 10.2 gm. of the raw acetonide of 21-bis-(hydroxymethyl)-5α-pregnane-3β-ol having a melting point of 155° C., then 165–170° C., which product was used as such for the next step of the synthesis.

This compound is not described in the literature.

The said product obtained above was introduced into 70 cc. of pyridine and 35 cc. of acetic acid anhydride. The reaction mixture was heated to 60° C. for a period of about forty-five minutes and then poured into a mixture of water and ice. The precipitate formed was washed with water and the raw acetonide of 3β-acetoxy-21-bis-(hydroxymethyl)-5α-pregnane were obtained which was used as such for the next step of the synthesis.

This compound is not described in the literature.

The said acetonide was dissolved in 200 cc. of ethanol and 20 cc. of water and 5 cc. of concentrated hydrochloric acid were added thereto. The mixture was held for a period of about two hours at room temperature and then was filtered, diluted with water and extracted with methylene chloride. The extract was washed with water until the wash waters were neutral, dried over magnesium sulfate and distilled to dryness. The residue was crystallized from ethyl acetate to obtain 7.67 gm. of 3β-acetoxy-21-bis-(hydroxymethyl)-5α-pregnane. For analysis this product was crystallized again from ethyl acetate. The purified product has a melting point of 155° C., then 169–170° C. and a specific rotation $[\alpha]_D^{20} = +25.6°$ (c.=1% in 95% ethanol).

The product was soluble in alcohol and chloroform, slightly soluble in ethyl acetate and insoluble in water and ether.

*Analysis.*—$C_{25}H_{41}O_4$; molecular weight=406.59. Calculated: C, 73.83%; H, 10.42%. Found: C, 73.6%; H, 10.3%.

This compound is not described in the literature.

STEP H.—PREPARATION OF 3β-ACETOXY-21-BIS-(IODOMETHYL)-5α-PREGNANE 6 gm. of 3β-acetoxy-21-bis-(hydroxymethyl)-5α-pregnane were dissolved in 30 cc. of pyridine. The solution was cooled to −15° C. and while agitating 3.8 cc. of methane sulfonyl chloride were added thereto. The reaction mixture was held for a period of about five hours at −10° C. and then was poured into 350 cc. of a mixture of water and ice containing 35 cc. of concentrated hydrochloric acid. The reaction mixture was extracted with methylene chloride and the organic phase was washed with water, dried over magnesium sulfate and concentrated to dryness to obtain 8.4 gm. of the raw dimethane sulfonate of 3β-acetoxy-21-bis-(hydroxymethyl)-5α-pregnane which was used as such for the following step of the synthesis.

This compound is not described in the literature.

The said dimethane sulfonate was taken up in 166 cc. of acetone and 18.5 gm. of sodium iodide were added. The reaction mixture was heated to reflux under agitation and under nitrogen for a period of about five hours. Then the reaction mixture was poured into water and extracted with methylene chloride. The extract was washed successively with saturated salt solution, with a 10% solution of sodium bisulfite and with saturated salt solution. The washed extract was then dried over magnesium sulfate, treated with animal carbon black, filtered and concentrated.

The oily residue was subjected to chromatography through silica gel. The column was eluted with methylene chloride and the product recovered was recrystallized with a mixture of acetone-methanol to obtain 6.822 gm. of 3β-acetoxy-21-bis-(iodomethyl)-5α-pregnane having a melting point of 102° and 105° C., and a specific rotation $[\alpha]_D^{20} = +11.5°$ (c.=1% in chloroform).

The product was soluble in ethyl acetate and chloroform, slightly soluble in acetone and insoluble in water and alcohol.

*Analysis.*—$C_{25}H_{40}O_2I_2$; molecular weight=626.41. Calculated: C, 47.93%; H, 6.44%; I, 40.52%. Found: C, 48.0%; H, 6.4%; I, 40.8%.

This compound is not described in the literature.

STEP I.—PREPARATION OF 3β-ACETOXY-21-BIS-(DIMETHYLAMINOMETHYL)-5α-PREGNANE AND ITS DIHYDROCHLORIDE 5.24 gm. of 3β-acetoxy-21-bis-(iodomethyl)-5α-pregnane were introduced into 160 cc. of dimethylamine at 0° C. The reaction vessel was hermetically sealed and agitated at room temperature for a period of about sixteen hours and then cooled to 0° C. After dimethylamine was distilled therefrom, the residue was taken up with ether and water and N sodium hydroxide solution was added thereto. The organic phase was washed with water and extracted several times with N hydrochloric acid and the new aqueous phase was separated, alkalinized with sodium hydroxide solution and extracted with ether. The ethereal extract was washed with saturated salt solution, dried over magnesium sulfate, filtered, distilled and dried to obtain 3.7 gm. of raw 3β-acetoxy-21-bis-(dimethylaminomethyl)-5α-pregnane.

This compound is not described in the literature.

The product prepared above was dissolved in 15 cc. of ether and the solution was filtered. After 15 cc. of methanol were added thereto, 15 cc. of a 1.12 N solution of dry hydrochloric acid in isopropanol were introduced slowly under agitation. The mixture was diluted by the addition of 45 cc. of ether and allowed to stand for crystallization. The crystals formed were vacuum filtered, washed with ether and dried to obtain 3.271 gm. of the dihydrochloride of 3β-acetoxy-21-bis-(dimethylaminomethyl)-5α-pregnane which upon recrystallization from isopropanol had a melting point of 242–245° C. (with decomposition), and a specific rotation $$[\alpha]_D^{20} = +31.5°$$

(c.=1% in ethanol).

The product was soluble in alcohol, water and dilute aqueous acids and insoluble in ether.

*Analysis.*—$C_{29}H_{54}O_2N_2Cl_2$; molecular weight=533.65. Calculated: C, 65.26%; H, 10.19%; N, 5.26%. Found: C, 65.3%; H, 10.3%; N, 5.1%.

This compound is not described in the literature.

*Example III.—Preparation of 3α-acetoxy-21-bis-(dimethylaminomethyl)-5β-pregnane-11-one and its dihydrochloride*

STEP A.—PREPARATION OF THE DIMETHYL KETAL OF 17β-FORMYL-5β-ANDROSTANE-3α-OL-11-ONE 4.760 gm. of 5β-pregnane-3α,20,21-triol-11-one were introduced under nitrogen and at room temperature into 96 cc. of methanol. Then 7.2 gm. of periodic acid were added and the reaction mixture held under nitrogen at room temperature for a period of an hour and thirty minutes. The reaction mixture was poured into 300 cc. of water and extracted with ethyl acetate. The organic extract was washed several times with water and the wash waters were re-extracted with ethyl acetate. Finally the organic extracts were combined, washed successively with a solution of sodium bicarbonate and with water until the wash waters were neutral, dried over magnesium sulfate and distilled to dryness. The residue was taken up with hot ether, concentrated, iced and the crystals formed were vacuum filtered to obtain 4.14 gm. of the dimethyl ketal of 17β-formyl-5β-androstane-3α-ol-11-one which upon recrystallization from isopropyl ether had a melting point of 155° C.

The product was soluble in alcohol and chloroform, rather soluble in ether and insoluble in water.

*Analysis.*—$C_{22}H_{36}O_4$; molecular weight=364.51. Calculated: C, 72.49%; H, 9.96%; O, 17.56%. Found: C, 72.3%; H, 9.9%; O, 17.8%.

The starting compound was prepared according to the method described by Sarett, J. Am. Chem. Soc. 71, 1165 (1949).

STEP B.—PREPARATION OF 3α-ACETOXY-17β-FORMYL-5β-ANDROSTANE-11-ONE 3.86 gm. of the dimethyl ketal of 17β-formyl-5β-androstane-3α-ol-11-one were introduced into 16 cc. of pyridine and 8 cc. of acetic acid anhydride. The solution was allowed to stand for a period of about three hours at room temperature and then was poured under agitation into a mixture of water and ice. The precipitate formed was vacuum filtered, washed with water until the wash waters were neutral and dried to obtain 4.159 gm. of the raw dimethyl ketal of 3α-acetoxy-17β-formyl-5β-androstane-11-one which was used as such for the next step of the synthesis.

4.06 gm. of the said dimethyl ketal were introduced into 160 cc. of aqueous acetone and 4.3 cc. of normal sulfuric acid and the reaction mixture was heated to reflux for a period of about 40 minutes. Then 40 cc. of the liquid was rapidly distilled therefrom and the reaction mixture was cooled. 50 cc. of water were added under agitation and the precipitate formed was vacuum filtered, washed with water until the wash waters were neutral and dried to obtain 3.4 gm. of 3α-acetoxy-17β-formyl-5β-androstane-11-one which upon recrystallization from isopropyl ether had a melting point of 149° C.

The product was soluble in acetone, benzene, and chloroform, slightly soluble in alcohol and isopropyl ether and insoluble in water.

*Analysis.*—$C_{22}H_{32}O_4$; molecular weight=360.48. Calculated: C, 73.29%; H, 8.95%; O, 17.75%. Found: C, 73.1%; H, 8.8%; O, 18.0%.

STEP C.—PREPARATION OF 3α-ACETOXY-21-CARBETHOXY-21-CYANO-Δ$^{20(21)}$-5β-PREGNENE-11-ONE 3.4 gm. of 3α-acetoxy-17β-formyl-5β-androstane-11-one were introduced into a mixture of 70 cc. of benzene, 3.4 cc. of acetic acid, 0.34 cc. of piperidine and 1.6 cc. of ethyl cyanacetate. The solution was heated to reflux under nitrogen for a period of five hours and then poured into a mixture of water and ice. The oily phase was extracted with methylene chloride and the extract was washed successively with a solution of sodium bicarbonate and with water until the wash waters were neutral. The washed extract was dried over magnesium sulfate, treated with animal carbon black, filtered and concentrated under vacuum. The residue was taken up with a 1:1 mixture of petroleum ether and isopropyl ether and allowed to stand for crystallization overnight. Then a 7:3 mixture of isopropyl ether and petroleum ether was added and the crystals formed were vacuum filtered, washed with the above-mentioned mixture and dried to obtain 2.730 gm. of raw 3α-acetoxy-21-carbethoxy-21-cyano-Δ$^{20(21)}$-5β-pregnene-11-one which was used as such for the following step of the synthesis. The product could be recrystallized from isopropyl ether to give a product having a melting point of 140° C.

The product was soluble in alcohol, acetone, benzene and chloroform, slightly soluble in isopropyl ether and insoluble in water.

*Analysis.*—$C_{27}H_{37}O_5N$; molecular weight=455.57. Calculated: C, 71.17%; H, 8.19%; N, 3.07%. Found: C, 71.3%; H, 8.1%; N, 3.4%.

STEP D.—PREPARATION OF 3-ACETOXY-21-CARBETHOXY-21-CYANO-5β-PREGNANE-11-ONE 0.956 gm. of palladized carbon black containing 10% of palladium hydroxide were placed in suspension in 28.8 cc. of ethanol and hydrogen was introduced until the catalyst was saturated. A suspension of 9.56 gm. of 3α - acetoxy-21-carbethoxy-21-cyano-Δ$^{20(21)}$-5β-pregnene-11-one, 160 cc. of ethanol and 0.8 cc. of 0.1 N sodium hydroxide was added thereto. Hydrogen was introduced into the mixture for a period of about ten minutes and then the suspension was filtered and the catalyst was washed with ethanol. The filtrate was combined with the ethanol wash liquors, and concentrated under vacuum to obtain 9.99 gm. of raw 3α-acetoxy-21-carbethoxy-21-cyano-5β-pregnane-11-one which was used as such for the following step of the synthesis.

STEP E.—PREPARATION OF 5β-PREGNANE-3α-OL-11-ONE-21,21-DICARBOXYLIC ACID 4.6 gm. of 3α-acetoxy-21-carbethoxy-21-cyano-5β-pregnane-11-one were introduced under nitrogen into 15 cc. of methanol. Then 10 cc. of a mixture of 50 cc. of water and 40 cc. of 48° Bé. potassium hydroxide solution were added. The reaction mixture was heated under agitation in a bath to 50° C. After fifteen minutes, the rest of the above mixture was added and the resultant mixture was heated to 135° C. under agitation and under nitrogen for a period of about two hours and thirty minutes. The reaction mixture was cooled to +5° C. and the solution obtained was acidified to a pH of 1 by the addition of 50% hydrochloric acid. The precipitate formed was extracted with ethyl acetate and the extract was washed successively with water and several times with a 10% solution of sodium bicarbonate. The extract was then acidified to a pH of 1 with 50% hydrochloric acid. The newly formed precipitate was again extracted with ethyl acetate and the extract was washed with water, dried over magnesium sulfate, filtered and concentrated under vacuum to a volume of about 20 cc. The solution was iced and the crystalline precipitate was vacuum filtered, washed with ethyl acetate and dried to obtain 3.55 gm. of raw 5β-pregnane-3α-ol-11-one-21,21-dicarboxylic acid having a melting point of 230–235° C. (with decomposition), which was used as such for the following step of the synthesis.

The product was soluble in alcohol, acetone and dilute aqueous alkalis, moderately soluble in ethyl acetate, and insoluble in water, ether, benzene, chloroform and dilute aqueous acids.

STEP F.—PREPARATION OF 21-DICARBOMETHOXY-5β-PREGNANE-3α-OL-11-ONE 3.635 gm. of 5β-pregnane-3α-ol-11-one-21,21-dicarboxylic acid were introduced into a solution of 8% hydrochloric acid in methanol. The reaction mixture was heated to reflux for a period of about one hour and then the solution was cooled and poured into a mixture of water and ice. The precipitate formed was extracted with methylene chloride and the extract was washed successively with water, with a 10% solution of sodium bicarbonate and with water until the wash waters were neutral. The washed extract was dried over magnesium sulfate, filtered and concentrated to dryness. The residue was taken up with isopropyl ether, heated to reflux and then iced. The crystals formed were vacuum filtered and dried to obtain 3.242 gm. of 21-dicarbomethoxy-5β-pregnane-3α-ol-11-one having a melting point of 129–130° C., which could be purified by recrystallization from ether.

The product was soluble in alcohol, acetone, benzene and chloroform, slightly soluble in ether and insoluble in water.

*Analysis.*—$C_{25}H_{38}O_6$; molecular weight=434.55. Calculated: C, 69.10%; H, 8.82%. Found: C, 69.0%; H, 8.7%.

STEP G.—PREPARATION OF 21-BIS-(HYDROXY-METHYL)-5β-PREGNANE-3α,11β-DIOL 2.3 gm. of lithium aluminum hydride were introduced over a period of five minutes into 60 cc. of tetrahydrofuran. Then a solution of 2 gm. of 21-(dicarbomethoxy)-5β-pregnane-3α-ol-11-one in 45 cc. of tetrahydrofuran were added thereto and the reaction mixture was agitated under nitrogen at room temperature for a period of about five and a half hours. The excess hydride was destroyed by the slow addition of ethyl acetate and then slowly 50 cc. of a saturated solution of sodium chloride was added. The organic phase was separated, washed with a saturated solution of sodium chloride, dried over magnesium sulfate, filtered and concentrated into dryness to obtain 1.825 gm. of raw 21-bis-(hydroxymethyl)-5β-pregnane-3α,11β-diol which were used as such for the following step of the synthesis.

The product was soluble in ethyl acetate.

STEP H.—PREPARATION OF 3α-ACETOXY-21-BIS-(ACETOXYMETHYL)-5β-PREGNANE-11β-OL 1.825 gm. of 21-bis-(hydroxymethyl)-5β-pregnane-3α,11β-diol were dissolved in 14 cc. of pyridine and 5.25 cc. of acetic acid anhydride were added. The reaction mixture was allowed to stand at rest at room temperature for a period of about three hours and then the said mixture was poured into a mixture of water and ice. The precipitate formed was extracted with methylene chloride and the extract was washed successively with 2 N hydrochloric acid, with water, with an aqueous solution of sodium bicarbonate and with water until the wash waters were neutral. The washed extract was dried over magnesium sulfate and concentrated to dryness to obtain 2.25 gm. of raw 3α-acetoxy-21-bis-(acetoxymethyl)-5β-pregnane-11β-ol which was employed as such for the following step of the synthesis.

The product could be purified by subjecting it to chromatography through magnesium silicate with elution with methylene chloride containing 1% of methanol. The product was soluble in ether and chloroform and insoluble in water.

STEP I.—PREPARATION OF 3α-ACETOXY-21-BIS-(ACETOXYMETHYL)-5β-PREGNANE-11-ONE 1.7 gm. of the raw 3α-acetoxy-21-bis-(acetoxymethyl)-5β-pregnane-11β-ol were dissolved under agitation at room temperature in 68 cc. of acetone. The solution obtained was cooled to +5° C. and 1 cc. of a sulfochromic acid mixture of 13.36 gm. of chromic acid anhydride, 11.5 cc. of concentrated sulfuric acid and sufficient water to make 50 cc. was added. The temperature of the reaction mixture was allowed to rise to +10° C. and another 0.5 cc. of the above sulfochromic acid mixture was added. After a half hour of agitation at a temperature situated between +10 and +15° C., the excess of the oxidant was destroyed by the addition of 8 cc. of methanol. The agitation was continued for a period of about fifteen minutes and then the solution was neutralized by the addition of sodium bicarbonate. Another period of agitation of twenty minutes preceded a treatment with animal carbon black. The solution was filtered, a small amount of pyridine was added and the solution was concentrated. The residue obtained in the form of an oil was subjected to chromatography through magnesium silicate with elutions with methylene chlorine containing 1% of methanol to obtain 1.247 gm. of raw 3α-acetoxy-21-bis-(acetoxymethyl)-5β-pregnane-11-one which was used as such for the following step of the synthesis. The product was soluble in acetone and chloroform.

STEP J.—PREPARATION OF 21-BIS-(HYDROXYMETHYL)-5β-PREGNANE-3α-OL-11-ONE 1.247 gm. of 3α-acetoxy-21-bis-(acetoxymethyl)-5β-pregnane-11-one were dissolved at reflux in 12.5 cc. of ethanol. Then a solution of 1.8 cc. of sodium hydroxide solution and 2.5 cc. of water was added. The reaction mixture was maintained at reflux for a period of twenty minutes and then poured into a mixture of water and ice. The solution was extracted with ethyl acetate and the extract was washed successively with 25% hydrochloric acid, with water, with a solution of sodium bicarbonate and with water until the wash waters were neutral. The washed extract was dried over magnesium sulfate, filtered and evaporated to dryness. The residue was taken up with isopropanol and the product was allowed to crystallize. Ethyl acetate was added thereto and the crystals obtained were vacuum filtered and dried. Two successive crystallizations from ethyl acetate were effected and finally 389 mg. of 21-bis-(hydroxymethyl)-5β-pregnane-3α-ol-11-one having a melting point of 162–163° C. and a specific rotation $[\alpha]_D^{20} = +68.3°$ (c.=0.5% in ethanol) were obtained.

The product was soluble in alcohol, slightly soluble in acetone and chloroform and insoluble in water, ether, benzene and propylene glycol.

*Analysis.*—$C_{23}H_{38}O_4$; molecular weight=378.53. Calculated: C, 72.98%; H, 10.12%. Found: C, 73.2%; H, 10.0%.

STEP K.—PREPARATION OF 3α-ACETOXY-21-BIS-(HYDROXYMETHYL)-5β-PREGNANE-11-ONE 500 mg. of 21-bis-(hydroxymethyl)-5β-pregnane-3α-ol-11-one were placed in suspension at 20–25° C. in 18 cc. of acetone and 0.05 cc. of 65% perchloric acid solution was then added. The reaction mixture was agitated for a period of two hours and a half at room temperature and the solution obtained was neutralized by the addition of an excess of sodium carbonate. The agitation was continued for a period of another hour. The reaction mixture was filtered and the filtrate was concentrated under vacuum in the presence of a little bit of pyridine to obtain 536 mg. of the raw acetonide of 21-bis-(hydroxymethyl)-5β-pregnane-3α-ol-11-one which was used as such for the following step of the synthesis.

The raw acetonide was taken up with 4 cc. of pyridine and under nitrogen 2 cc. of acetic acid anhydride were added. The reaction mixture was agitated for a period of two hours at room temperature and then ice was added. The precipitate formed was extracted several times with methylene chloride and the combined extracts were washed successively with 2 N hydrochloric acid solution, with water, with a dilute solution of sodium bicarbonate and with water until the wash waters were neutral. The washed extract was dried over magnesium sulfate and concentrated to dryness under vacuum to obtain 557 mg. of the raw acetonide of 3α-acetoxy-21-bis-(hydroxymethyl)-5β-pregnane-11-one which was used as such for the following step of the synthesis.

The 557 mg. of the said acetonide were taken up with 5 cc. of methanol and 0.1 cc. of 6 N hydrochloric acid solution was then added at room temperature. The reaction mixture was agitated for a period of about one hour and poured into water. The precipitate formed was extracted several times with methylene chloride and the combined extracts were washed successively with a dilute solution of sodium bicarbonate and with water until the wash waters were neutral. The washed extract was dried over sodium sulfate and concentrated to dryness under vacuum. The residue was subjected to chromatography through magnesium silicate with elution with methylene chloride containing 3% and 5% of methanol to obtain 290 mg. of raw 3α-acetoxy-21-bis-(hydroxymethyl)-5β-pregnane-11-one which by trituration with isopropyl ether gave a purified product having a melting point of 138° C.

The product was soluble in chloroform, rather soluble in ether, slightly soluble in isopropyl ether and insoluble in water.

STEP L.—PREPARATION OF THE DIMETHANE SULFONATE OF 3α-ACETOXY-21-BIS-(HYDROXYMETHYL)-5β-PREGNANE-11-ONE 1 gm. of 3α-acetoxy-21-bis-(hydroxymethyl)-5β-pregnane-11-one was dissolved in 5 cc. of pyridine. After the solution obtained was cooled to −10° C., 0.62 cc. of methane sulfonyl chloride was added thereto under agitation and the reaction mixture was maintained at −10° C. under agitation and under nitrogen for a period of about five hours. The reaction mixture was then poured into a mixture of water and ice with an excess of hydrochloric acid and the gummy precipitate formed was extracted with methylene chloride. The extract was washed successively with a dilute solution of hydrochloric acid, with water, with a solution of sodium bicarbonate and again with water, dried over magnesium sulfate and concentrated to obtain 1.3 gm. of raw dimethane sulfonate of 3α-acetoxy-21-bis-(hydroxymethyl)-5β-pregnane-11-one which was used as such for the next step of the synthesis.

The product was soluble in acetone and chloroform, and insoluble in water and dilute aqueous acids and alkalis.

This compound is not described in the literature.

STEP M.—PREPARATION OF 3α-ACETOXY-21-BIS-(IODOMETHYL)-5β-PREGNANE-11-ONE 1.3 gm. of the dimethane sulfonate of 3α-acetoxy-21-bis-(hydroxymethyl)-5β-pregnane-11-one were dissolved in 45 cc. of acetone and then 3.45 gm. of sodium iodide were added and the mixture was heated to reflux under agitation for a period of about two hours. The reaction mixture was then cooled, water added thereto and the reaction mixture was extracted with ether. The extract was washed successively with a dilute solution of sodium bisulfite and with water, dried over magnesium sulfate and concentrated to obtain 1.45 gm. of raw 3α-acetoxy-21-bis-(iodomethyl)-5β-pregnane-11-one. The raw product was purified by subjecting it to chromatography through silica gel with elution with methylene chloride, followed by crystallization in a mixture of methanol and ethyl acetate. The purified 3α-acetoxy-21-bis-(iodomethyl)-5β-pregnane-11-one had a melting point of 135° C. and a specific rotation $[\alpha]_D^{20} = -48.5° \pm 1°$ (c.=0.9% in chloroform).

The product was soluble in ether, benzene and chloroform, slightly soluble in ethyl acetate and alcohol, and insoluble in water and dilute aqueous acids and alkalis.

Analysis.—$C_{25}H_{38}O_3I_2$; molecular weight=640.39. Calculated: C, 46.88%; H, 5.98%; I, 39.64%. Found: C, 47.0%; H, 6.0%; I, 39.8%.

This compound is not described in the literature.

STEP N.—PREPARATION OF 3α-ACETOXY-21-BIS-(DIMETHYLAMINOMETHYL)-5β-PREGNANE-11-ONE AND ITS DIHYDROCHLORIDE 500 mg. of 3α-acetoxy-21-bis-(iodomethyl)-5β-pregnane-11-one were dissolved in 25 cc. of dimethylamine cooled to 0° C. and the reaction mixture was agitated at ambient temperature in a hermetically closed reaction vessel for a period of 20 hours. Then the dimethylamine was distilled therefrom and the residue was taken up with ether and water. The combined solutions were alkalinized and the organic phase was separated and extracted with N hydrochloric acid. The new aqueous phase was separated, alkalinized and extracted with ether. The ethereal solution was washed with saturated salt solution, dried and concentrated to obtain 330 mg. of raw 3α-acetoxy-21-bis-(dimethylaminomethyl) - 5β-pregnane-11-one.

This compound is not described in the literature.

The product obtained above was taken up with ether and the solution was filtered. 4.5 cc. of a solution of 0.37 N dry hydrochloric acid in isopropanol were added and the reaction mixture was allowed to stand for crystallization. The crystals formed were vacuum filtered and dried to obtain 230 mg. of the raw dihydrochloride of 3α-acetoxy - 21 - bis-(dimethylaminomethyl)-5β-pregnane-11-one which upon recrystallization from a mixture of methanol and isopropanol had a melting point of 230° C. (with decomposition) and a specific rotation $$[\alpha]_D^{20} = +84° \pm 3° \ (c=0.7\% \text{ in water})$$

The product was soluble in alcohol and water, slightly soluble in isopropanol and insoluble in ether and benzene.

Analysis.—$C_{29}H_{52}O_3N_2Cl_2$; molecular weight=547.63. Calculated: C, 63.60%; H, 9.56%; N, 5.11%. Found: C, 63.6%; H, 9.2%; N, 5.0%.

This compound is not described in the literature.

*Pharmacological data*

A. 3α-ACETOXY-21-BIS-(DIMETHYLAMINOMETHYL)-5β-PREGNANE (a) *Action on coronary blood flow.*—The study of the activity of the said compound on coronary blood flow was effected on the isolated rabbit heart previously intoxicated with a barium salt by utilizing a technique inspired by Langendorff (Arch. gesam. Physiol., 1895, 61, 291).

In this method, the heart was suspended by the aorta to a canula and the coronary system was perfused, by means of this canula, under a constant pressure of 5 cm. of mercury with Locke serum at a pH of 7.2 to 7.3, heated to 37° C. The compound studied was placed in solution in physiological serum. This solution is diluted by means of the Locke serum to the desired concentrations. A three-way stopcock allowed instantaneous passage of the Locke serum or the serum containing the test product. On the proper apparatus, the coronary blood flow was registered and parallelly the ventriculary contractions.

The minimal concentration of the said compound which clearly augments the coronary blood flow of such a preparation was systematically determined and Table I summarizes the results obtained with the compound of the invention as well as with trinitrine and papaverine under the same experimental conditions.

TABLE I

| Compounds studied | Minimal concentration in μg./cc. in perfusion liquid, μg. | Increase of coronary blood flow in percent of normal blood flow (Locke+BaCl₂) | Duration of action in minutes | Effect on ventriculary contractions expressed as percent of initial value | |
|---|---|---|---|---|---|
| | | | | On the amplitude | On the frequency |
| Trinitrine | 1 | 57 | 13 | ¹ +15 | −15 |
| Papaverine | 1 | 60 | >20 | −30 | +15 |
| 3α-acetoxy-21,21-bis-(dimethylaminomethyl)-5β-pregnane. | 0.001 | 10 to 30 | 10 | 0 | 0 |
| | 0.01 | 30 to 100 | 20 | (²) | 0 |

¹ Fleeting.
² Slightly increased.

(b) *Action of the cardiac muscle.*—According to the classic technique of Straub, Ringer liquid was introduced into the ventricle of a frog heart suspended by a canula permitting the introduction of the liquid. The beating of the heart was registered. Next by the canula, a solution of 3α-acetoxy - 21 - bis-(dimethylaminomethyl)-5β-pregnane was introduced at increasing concentrations with a solution containing 2.5 γ/cc. A slight negative inotropic action was noted at 5 γ/cc. The negative inotropic action was very clear and durable. It did not disappear by washing of the cardiac preparation. At stronger doses, the heart finished by stopping in demisystole. The said compound has no action on the force or the rhythm of the contractions.

(c) *Effect on peripheric circulation.*—The vasodilatatory action of 3α-acetoxy-21-bis-(dimethylaminomethyl)-5β-pregnane was studied on the isolated rabbit paw in situ according to a technique inspired by that described by Binet et al. (Presse Medicale, 1949, p. 445). The animal was anesthetized with urethane and its blood was heparinated. The paw was isolated circulatorily by ligature high on the femoral artery. The aspired blood at the carotide was perfused at constant blood flow by the intermediary of a Jouvelet transfusion apparatus into the femoral artery of the isolated paw. The perfused artery was in addition connected to a Ludwig manometer which allowed the registration of the pressure in this artery and thus gave information on the vasodilatation or vasoconstriction. The compound studied placed in solution in physiological serum at a concentration of 5 mg./cc. was injected by intravenous method.

The determination of the peripheric vasodilatatory effect was practiced in two ways:

(a) Either on a construction stage obtained by the intravenous injection of barium chloride, (b) Or while forcefully increasing the blood flow of the Jouvelet apparatus which produced an increase of pressure in the perfused paw; this increase stabilized itself at a level which permitted the notation of the eventual vasodilatatory effect of the product being studied.

The two methods led to similar results. A dose of 500 γ/kg. provoked a slight but durable vasodilatation. A dose of 1 mg./kg. accentuated the effect of the first dose without provoking modification of the carotidiennic pressure. This vasodilatation was maintained at least for a period of some 30 minutes.

(c) *Determination of the acute toxicity.*—The test of acute toxicity was effected on mice of the Rockland strain weighing between 18 and 22 gm. 3α-acetoxy-21-bis-(dimethylaminomethyl)-5β-pregnane was placed in solution of physiological serum at a concentration of 10 mg./cc. It was injected to lots of ten mice intravenously at doses of 25, 50 and 75 mg./kg. in a volume of 0.2 cc. and the animals were placed under observation for a period of seven days. At a dose of 25 mg./kg., no symptoms of intoxication nor mortality were observed. The dose of 50 mg./kg. caused the death of five animals out of ten. The dose of 75 mg./kg. caused the death of eight animals out of ten. The average toxic dose $DL_{50}$ was thus about 50 mg./kg.

B. 3β-ACETOXY-21-BIS-(DIMETHYLAMINO-METHYL)-5α-PREGNANE (a) *Action on the coronary blood flow in the isolated rabbit heart.*—The study of the action of the compound on the coronary blood flow was effected on the isolated rabbit heart previously intoxicated by a solution of barium salt by following the technique inspired by that of Langendorff, Arch. gesam. Physiol. 1895, 61, 291 used in the previous test. The results summarized in Table II show the 3β-acetoxy-21-bis-(dimethylaminomethyl)-5α-pregnane is clearly active on the coronary blood flow of the isolated heart intoxicated or not with barium chloride at concentrations very much smaller than those of papaverine hydrochloride.

TABLE II

| Compounds studied | Minimal concentration in μg./cc. in perfusion liquid | Increase of coronary blood flow in percent of normal blood flow (Locke+BaCl₂) | Duration of action in minutes | Effect on ventriculary contractions expressed as percent of initial value | |
|---|---|---|---|---|---|
| | | | | On the amplitude | On the frequency |
| 3β-acetoxy-21,21-bis-(dimethyl-aminomethyl)-5α- pregnane (heart intoxicated with barium chloride). | 0.001 | 20 to 40 | 10 | 0 | 0 |
| | 0.01 | 20 to 50 | 10 | 0 | 0 |
| Papaverine hydrochloride (heart intoxicated with barium chloride). | 1 | 60 | 20 | −30 | +15 |
| Trinitrine | 1 | 57 | 13 | ¹+15 | −15 |

¹ Fleeting.

(b) *Acute toxicity.*—The test of toxicity was effected on mice of Rockland strain weighing between 18 and 22 gm. 3β-acetoxy-21-bis-(dimethylaminomethyl)-5α-pregnane was placed in solution in physiological serum at a concentration of 10 mg./cc. and was injected by intravenous method to lots of ten mice at doses respectively of 10 mg., 20 mg. and 25 mg./kg. The animals were placed under observation for a period of one week. At a dose of 10 mg./kg., no mortality was observed. A dose ten. The animals presented first symptoms of motor of 20 mg./kg. caused a mortality of four animals out of ten. The animals presented first symptoms of motor incoordination, jerky movements and then convulsions. The average toxic dose $DL_{50}$ was about 22 mg./kg.

Various modifications of the process and compositions of the invention may be made without departing from the spirit or scope thereof and it is to be understood that the invention is intended to be limited only as defined in the appended claims.

We claim:

1. Compound selected from the group consisting of 21-bis-(aminomethyl)-pregnanes having the formula

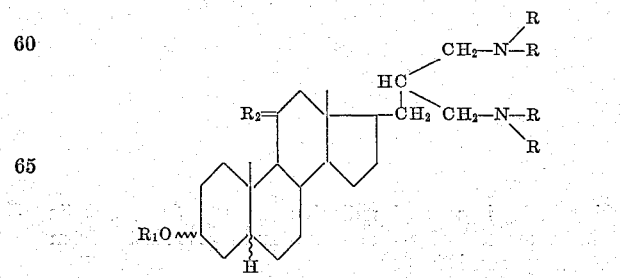

wherein R is selected from the group consisting of hydrogen and alkyl radicals having 1 to 8 carbon atoms, R₁O— is selected from the group consisting of hydroxy and acyloxy derived from an organic carboxylic acid having 1 to 18 carbon atoms and is in the α-position of 5β-pregnanes and in the β-position of 5α-pregnanes and R₂ is selected from the group consisting of

and =O and non-toxic, pharmacologically acceptable acid addition salts thereof.

2. 3α - acetoxy-21-bis-(dimethylaminomethyl)-5β-pregnane.
3. 21-bis-(dimethylaminomethyl)-5β-pregnane-3α-ol.
4. The dihydrochloride of 3α - acetoxy - 21 - bis - (dimethylaminomethyl)-5β-pregnane.
5. The dihydrochloride of 21 - bis - (dimethylaminomethyl)-5β-pregnane-3α-ol.
6. 3β - acetoxy - 21 - bis - (dimethylaminomethyl) - 5α-pregnane.
7. The dihydrochloride of 3β-acetoxy-21-bis-(dimethylaminomethyl)-5α-pregnane.
8. 3α-acetoxy - 21 - bis - (dimethylaminomethyl) - 5β-pregnane-11-one.
9. The dihydrochloride of 3α - acetoxy - 21 - bis - (dimethylaminomethyl)-5β-pregnane-11-one.
10. Compound of the formula

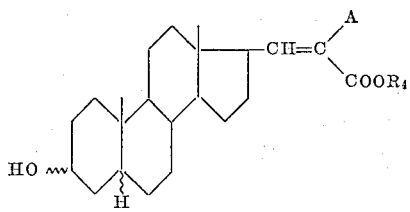

wherein A is selected from the group consisting of —CN and —COOR₄ and R₄ is a lower alkyl radical.

11. Compound of the formula

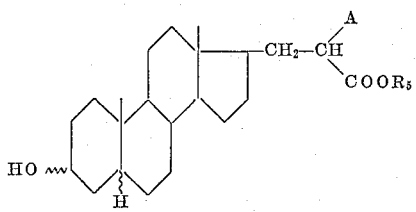

wherein A is selected from the group consisting of —CN and —COOR₅ and R₅ is selected from the group consisting of hydrogen, lower alkyl and an alkali metal salt and R₅ must be lower alkyl when A is —CN.

12. Compound of the formula

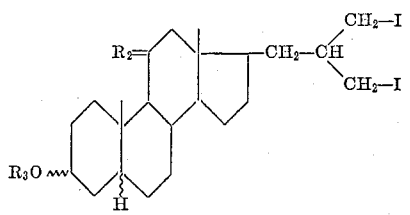

wherein R₃ is an acyl radical of an organic carboxylic acid having 1 to 18 carbon atoms and R₂ is selected from the group consisting of

and =O.

13. Compound of the formula

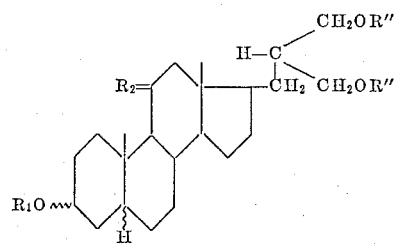

wherein R₂ is selected from the group consisting of =O and

R₁ is selected from the group consisting of hydrogen and an acyl radical of an organic carboxylic acid having 1 to 18 carbon atoms and R″ is selected from the group consisting of hydrogen and SO₂—Y and Y is a lower alkyl radical.

14. Compound of the formula

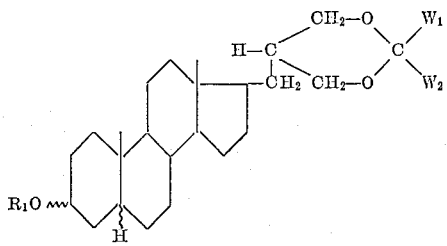

wherein R₁ is selected from the group consisting of hydrogen and an acyl radical of an organic carboxylic acid having 1 to 18 carbon atoms and W₁ and W₂ are selected from the group consisting of hydrogen and lower alkyl.

15. Novel spasmolytic composition comprising an amino pregnane selected from the group consisting of 21-bis-(aminomethyl)-pregnanes having the formula

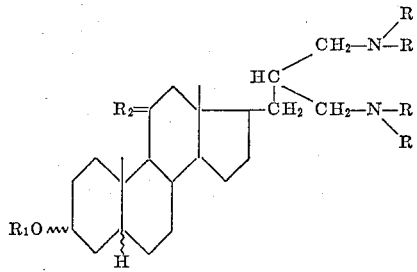

wherein R is selected from the group consisting of hydrogen and alkyl radicals having 1 to 8 carbon atoms, R₁O— is selected from the group consisting of hydroxy and acyloxy derived from an organic carboxylic acid having 1 to 18 carbon atoms and is in the α-position of 5β-pregnanes and in the β-position of 5α-pregnanes and R₂ is selected from the group consisting of

and =O and non-toxic, pharmacologically acceptable acid addition salts thereof and a major amount of a pharmaceutical carrier.

16. The composition of claim 15 wherein the amino pregnane is 3α-acetoxy-21-bis-(dimethylaminomethyl)-5β-pregnane.

17. The composition of claim 15 wherein the amino pregnane is 3β-acetoxy-21-bis-(dimethylaminomethyl)-5α-pregnane.

18. A method of treating spasms of coronary origin which comprises administering an effective amount of an amino pregnane selected from the group consisting of 21-bis-(aminomethyl)-pregnanes having the formula

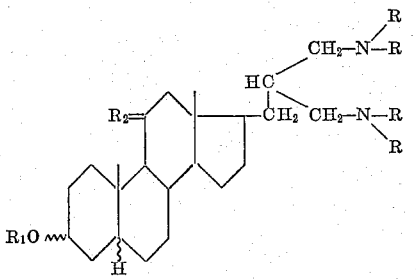

wherein R is selected from the group consisting of hydrogen and alkyl radicals having 1 to 8 carbon atoms, $R_1O-$ is selected from the group consisting of hydroxy and acyloxy derived from an organic carboxylic acid having 1 to 18 carbon atoms and is in the α-position of 5β- pregnanes and in the β-position of 5α-pregnanes and $R_a$ is selected from the group consisting of

and =O and non-toxic, pharmacologically acceptable acid addition salts thereof.

19. The method of claim 18 wherein the amino pregnane is 3β - acetoxy-21-bis-(dimethylaminomethyl)-5α-pregnane.

20. The method of claim 18 wherein the amino pregnane is 3α-acetoxy-21-bis-(dimethylaminomethyl)-5β-pregnane.

References Cited by the Examiner
UNITED STATES PATENTS
2,344,992   3/44   Logemann et al. _____ 260—397.4

LEWIS GOTTS, *Primary Examiner.*

UNITED STATES PATENT OFFICE
CERTIFICATE OF CORRECTION

Patent No. 3,180,796                                April 27, 1965

Daniel Bertin et al.

It is hereby certified that error appears in the above numbered patent requiring correction and that the said Letters Patent should read as corrected below.

Column 13, line 4, for "(methoxymethyl)" read -- (hydroxymethyl) --; column 17, line 49, for "$C_{25}H_{41}O_4$" read -- $C_{25}H_{42}O_4$ --; column 30, line 1, for "$R_a$" read -- $R_2$ --.

Signed and sealed this 3rd day of May 1966.

(SEAL)
Attest:

ERNEST W. SWIDER                                            EDWARD J. BRENNER
Attesting Officer                                               Commissioner of Patents